United States Patent [19]

Sharpe

[11] 4,208,845
[45] Jun. 24, 1980

[54] METHOD FOR GRINDING PISTON RINGS

[75] Inventor: Robert L. Sharpe, Richmond, Ind.

[73] Assignee: Dana Corporation, Toledo, Ohio

[21] Appl. No.: 947,203

[22] Filed: Sep. 29, 1978

Related U.S. Application Data

[63] Continuation-in-part of Ser. No. 779,281, Mar. 18, 1977, Pat. No. 4,123,072.

[51] Int. Cl.² .............................................. B24B 1/00
[52] U.S. Cl. ...................................................... 51/290
[58] Field of Search ................ 51/98 R, 105 R, 131.2, 51/125 R, 290; 29/156.6, 156.63

[56] References Cited

U.S. PATENT DOCUMENTS

| | | | |
|---|---|---|---|
| 1,783,047 | 11/1930 | Marshall | 51/290 X |
| 2,474,358 | 6/1949 | Howlett | 51/125 X |
| 2,663,127 | 12/1953 | Hunt | 51/105 R |
| 3,073,689 | 1/1963 | Kupfert | 51/324 |
| 3,377,750 | 4/1968 | Day | 51/216 R X |
| 3,918,211 | 11/1975 | Packard | 51/290 X |
| 3,971,165 | 7/1976 | Packard | 51/290 X |

FOREIGN PATENT DOCUMENTS 501286 2/1939 United Kingdom .................... 29/156.6

Primary Examiner—Gary L. Smith
Attorney, Agent, or Firm—W. A. Schaich

[57] ABSTRACT

A method and apparatus for grinding a split piston ring having at least one inwardly converging top or bottom wall member by bringing such wall into engagement with a rotating grinding member having a spherical segment working surface, the path of such relative movement being along a line which is coincident with the axis of the piston ring and also coincident with a radius of the spherical surface of the grinding member, whereby all of the inwardly converging surface of the split piston ring is concurrently ground to conform to the curvature of the spherical segment surface of the grinding member.

5 Claims, 8 Drawing Figures

METHOD FOR GRINDING PISTON RINGS

RELATED APPLICATION

This application constitutes a continuation-in-part of my pending applicaton Ser. No. 779,281, filed Mar. 18, 1977 now U.S. Pat. No. 4,123,072.

BACKGROUND OF THE INVENTION

1. Field of the Invention

The invention broadly relates to a method and apparatus for manufacturing keystone type piston ring structures which are typically employed as compression rings in engines and utilized in a wide variety of engine applications. The objective of the ring structure is to effect a seal in the space between an associated piston and liner to prevent the high-pressure combustion gases or the air charge from escaping down the liner during the compression or power strokes; to transmit head energy from the piston to the cooled cylinder liner; and to absorb a certain part of the fluctuations of the piston side thrust.

2. Description of the Prior Art

Some internal combustion engines have compression rings with the bottom wall or both the bottom and top walls beveled, making the ring thinner at the inside than at the ouside diameter. The associated groove in the piston for receiving the ring is machined to the same general shape. The gas pressure acting on the top wall of the ring owing to the bevelled bottom surface, produces an additional force pressing the ring outwardly against the cylinder wall and helping to adequately effect the desired seal.

On the other hand, at each reversal of the side thrust of the piston, the ring slides slightly into the associated groove, is pressed against the upper groove wall, crushes the carbon which is deposited on it, and keeps the ring from sticking.

It is an objective of the present invention to produce a piston ring structure for a fluid pressure system wherein the sealing relationship of the ring and the associated piston is improved to effect a gas-tight seal.

It is another object of the invention to produce a piston ring structure wherein line-to-line contact is achieved between the piston ring and the peripheral groove in the associated piston to prevent combustion gases, for example, in an internal combustion engine from passing to the crankcase, and oil from passing to the combustion chamber in excess quantities.

Still another object of the invention is to produce a piston ring structure wherein at least one wall thereof is inclined inwardly and of a curved cross-section to thereby cooperate with a suitably shaped groove in an associated piston to effect a line-to-line contact between the curved surface of the ring and the outer edge of the groove in the piston.

Another object of the invention is to produce a piston ring having at least one inwardly inclined wall of curved cross-section which may be readily and economically manufactured.

A specific object of the invention is to provide a method and apparatus for making a piston ring having at least one inwardly machined wall of a curved cross-section.

BRIEF DESCRIPTION OF THE DRAWINGS

Other objects and advantages of the invention will become clearly apparent to those skilled in the art from reading the following detailed description of an embodiment of the invention when considered in the light of the accompanying drawings, in which.

DETAILED DESCRIPTION OF PREFERRED EMBODIMENTS OF THE INVENTION

The present invention relates to piston rings which are self-tensioned annular metal pieces installed in piston grooves to provide a moveable seal between the combustion chamber and the crankcase of an internal combustion engine, and the manufacture of such rings.

The metal used for piston rings must meet a number of requirements. The metal must be a good bearing material and have a low rate of wear. In certain instances, the metal of the ring will be coated with a material having such properties. The metal additionally should be suitably hard and of high strength, yet readily machinable. It must be a good spring material and resistant to fatigue. Ring materials must be able to operate under conditions of boundary lubrication while carrying high loads. The metal must substantially retain its mechanical strength while working at elevated temperatures and pressures in the associated engine. Also, the hot corrosive products of combustion should not have an extremely adverse effect on the wearing qualities and properties of the metal of the rings.

To reduce the wear of piston rings and impart desirable characteristics thereto, a number of coatings and platings may be applied.

Some types of special facings, such as for example a thin bearing surface of antifriction metal or chemical treatment, facilitate the run-in or seating of new rings. Such facings may cause tiny rough spots on the surfaces of the rings and the associated cylinder liner to wear off gradually, so that good surface to surface contact is achieved without excess friction which might cause scuffing or scarring.

All of the various desirable characteristics of the material of the piston rings cooperate to cause the piston rings to provide an operative moving seal preventing combustion gases from passing to the crankcase and oil from passing to the combustion chamber in excess quantities. This dual function has led to the development over the years of two basic piston ring types—compression rings and oil rings. Within these broad categories, hundreds of different design variations have been developed. Typically, rings of proper design are combined into sets to provide the best and optimum performance for each engine under all operating conditions.

Figure 1:
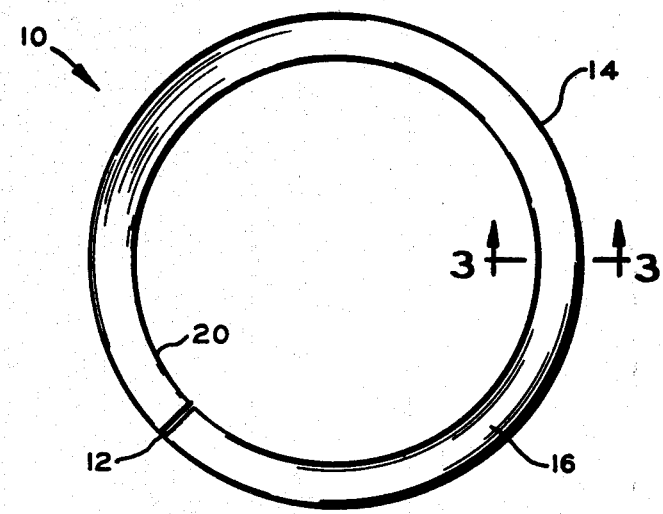
FIG. 1 is a top plan view of a piston ring incorporating the salient features of the present invention.
Figure 2:
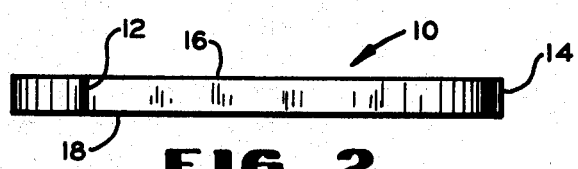
FIG. 2 is a front view of the piston ring illustrated in FIG. 1.
Figure 3:
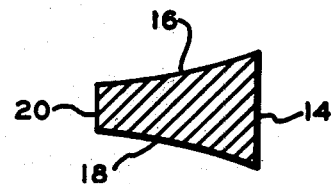
FIG. 3 is a sectional view of the piston ring illustrated in FIGS. 1 and 2 taken along line 3—3 of FIG. 1.
Figure 4:
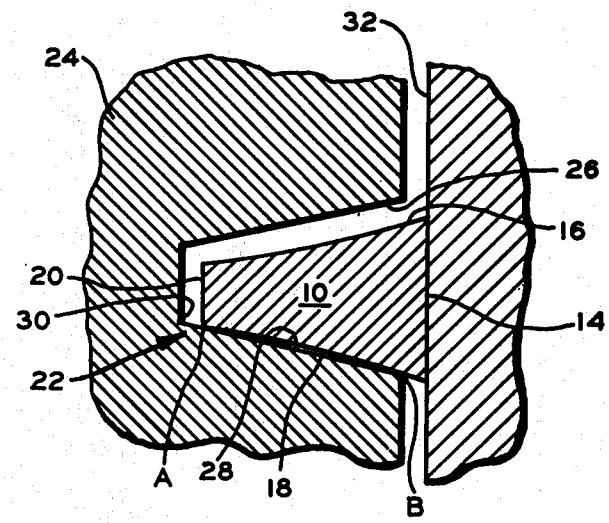
FIG. 4 is an enlarged fragmentary sectional view of the piston ring illustrated in FIGS. 1 and 2 in use within a groove of an associated piston.

Referring to FIGS. 1, 2, 3 and 4, there is shown a piston ring 10, embodying the features of the present invention, having a gap 12. The ring 10 is typically referred to as a keystone-type piston ring having an outer peripheral wall 14 often referred to as the piston ring face; and inwardly converging top wall 16; and inwardly converging bottom wall 18, and an inner wall 20. The top wall 16 and the bottom wall 18 are formed to assume a slightly concave cross-sectional configuration, as is more clearly apparent in FIG. 4 wherein the piston ring 10 is shown as being received in a groove 22 formed in the peripheral side wall of an associated piston 24. The groove 22 is defined by an inwardly converging top wall 26, an inwardly converging bottom wall 28, and a rear wall 30. The piston 24 is adapted to reciprocate within a cylinder defined by a cylinder wall 32. The diameter of the ring 10, when free, is typically slightly larger than the cylinder bore; consequently, when the ring is squeezed into the cylinder, it presses against the cylinder wall 32 of the engine and tends to effect a seal. This initial sealing action is greatly improved in operation by the pressure of the engine during the power stroke, as illustrated in FIG. 4 (which exaggerates the clearances for the sake of clarity). The pressure of the compression air or of the compression gases against the top surface 16 of the ring 10 forces the ring downwardly on the lower side 28 of the peripheral groove 22 of the associated piston 24, tending to cam the ring 10 radially outwardly. This leaves a clearance at the top side 16 of the ring permitting the gas pressure to travel behind the back wall 20 of the ring. This gas pressure, in turn, acting on the back wall 20 of the ring additionally forces the ring outwardly into firmer contact with the cylinder wall 32. When there is little or no gas pressure to be sealed, the ring is free in the groove 22 and its own tension creates only a light pressure against the cylinder wall 32, causing minimum friction and wear; but when the gas pressure increases, the ring is caused to press correspondingly tighter both against the cylinder wall 32 and against the piston groove 22, thus cooperating to improve the seal and reduce the leakage, resulting in a more efficient and pollution-free engine.

It has been found that the curved cross-sectional configuration of the top wall 16 and the bottom wall 18 of the ring 10 has produced an operative piston ring having improved sealing characteristics and thus improved operating characteristics of the engine. By reason of the curved configuration of the upper and lower surfaces of the piston ring, line-to-line contact is achieved between one of the inwardly converging top or bottom walls of the piston ring and the facing wall of the groove. Specifically, FIG. 4 shows the piston and piston ring assembly during the power stroke of the engine wherein the pressure of the combustion gases is instantaneously applied to the top wall 16 and the rear wall 20 of the ring providing an outward pressure component tending to hold the ring face 14 in sealing relation with respect to the cylinder wall 32. It will be appreciated that as the above forces act on the ring 10, the lower wall 18 of the ring tends to be cammed outwardly along the inclined wall 28 of the groove 22. Manifestly, this action tends to create and maintain a sealing relation between the ring face 14 and the cylinder wall 32. However, during this same time period the lower surface 18 of the ring has established a line-to-line contact with the lower surface 28 of the groove 22 at the bottom of the wall 20 of the ring as at A and at the outermost edge of the lower wall 28 of the groove 22 as at B. Thus, the vertical forces tending to push the ring 10 into sealing relation with the groove 22 are concentrated along the line-to-line contacts A and B. It has been found that even during the run-in period for new rings, the configuration has resulted in improved operating characteristics. More specifically, the oil consumption and amount of blowby has been materially decreased through the use of piston rings fabricated in accordance with the above description.

Figure 5:
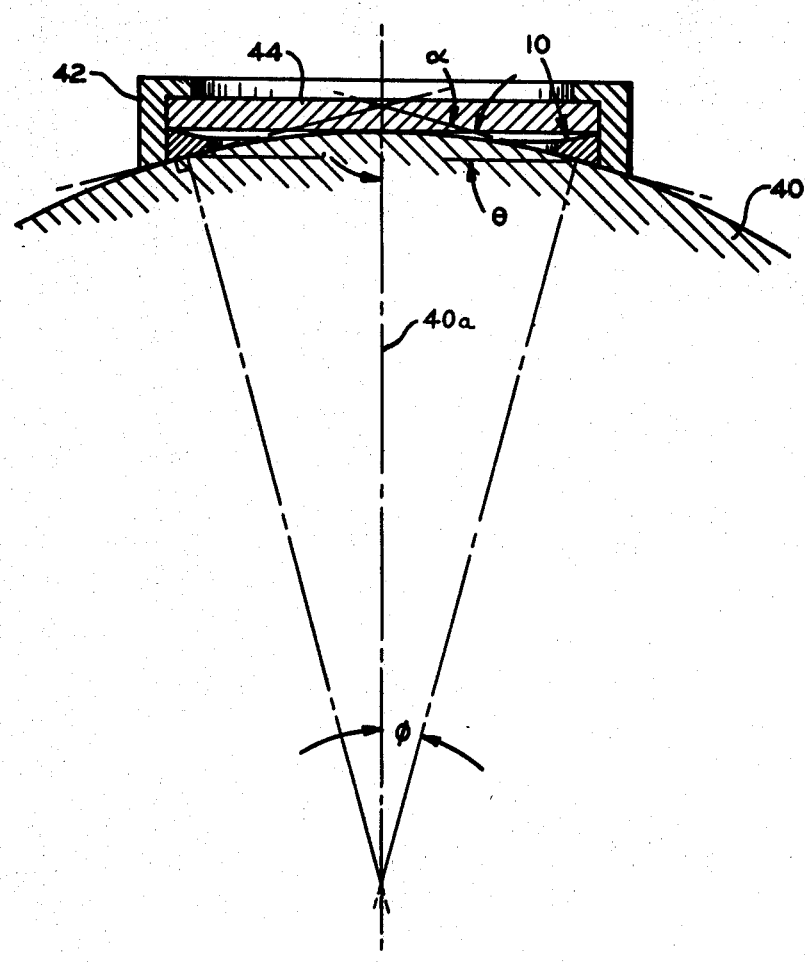
FIG. 5 is a schematic illustration of an apparatus for achieving the top or bottom wall configuration of the piston ring illustrated in FIGS. 1 through 4.

The technique for finishing the top wall 16 and bottom wall 18 of the ring 10 is accomplished by the apparatus schematically illustrated in FIG. 5. The apparatus consists basically of a rotating lapping sphere 40, the peripheral surface of which is coated with abrasive particles. The piston ring 10 being finished is suitably contained within an annular confining fixture 42. A disc shaped hold down plate 44 having a diameter slightly less than the inside diameter of the confining member 42 is employed to apply substantially equal downward pressure to the top wall 16 of the ring 10 to thereby cause the bottom wall 18 of the ring to move into contact with the spherical peripheral surface of the lapping sphere 40 along a path passing thru the central 40a of lapping sphere 40. As the lapping shpere 40 is caused to rotate about its axis, the abrasive particles carried thereby effectively form a concave surface concurrently on all areas of the bottom wall 18 of the contained ring 10. When the desired surface configuration and smoothness is achieved, the ring 10 is turned over so that the opposite wall 16 is brought into contact with the spherical abrasive surface to achieve the desired concave surface. In order to determine the radius of the lapping sphere 40 to be used for a given ring, the following method has been successfully utilized:

$\alpha = 180 - 90 - \theta = 90 - \theta$ $\phi = 180 - 90 - \alpha = 90 - \alpha$ $\phi = 90 - (90 - \theta) = \theta$ $\phi = \theta$ $\sin \theta = A/R$ or $R = A/\sin \theta$ Since $\phi = \theta$ Therefore $R = A/\sin \theta$ Where A = (Ring Diameter − Ring Wall)/2 and $\theta$ = Keystone Angle

Referring to FIG. 5 of the drawings, it is readily apparent that the radius of the lapping sphere is sufficiently large that the inwardly converging surface of the piston ring is substantially in tangential engagement with said sphere surface.

While the lapping sphere 40 has been referred to as being a sphere, which means that it may rotate about any axis passing through its center and accomplish the desired grinding action on the top or bottom wall 16, 18 of the ring 10, an obvious modification of this invention (FIG. 7) would form the lapping surface as a spherical segment surface 45a on a member 45 rotating about the axis of a power shaft 46. The main requirements of such member 45 is that (1) the extent of its working surface must be in excess of the diameter of the constrained ring 10 in order that all portions of the surface 16 or 18 of ring 10 are simultaneously contacted by the sperical lapping surface 45a, and (2) the relative movement of the constrained ring 10 and the spherical segment grinding surface be along a path that is coincident with the axis 10a of ring 10 (FIG. 8) and also is a radius of the spherical segment surface 46a.

Figure 7:
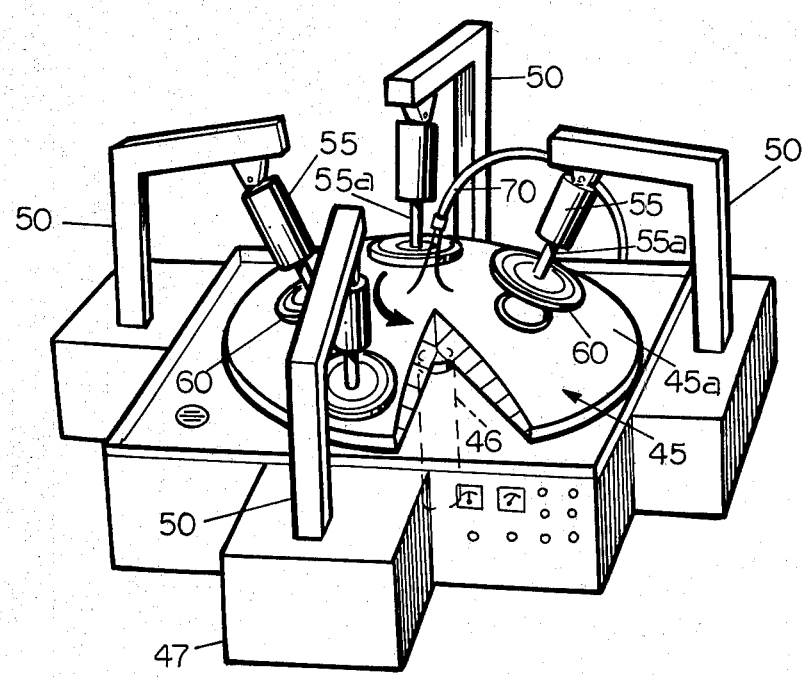
FIG. 7 is a schematic perspective view of a modified form of grinding equipment for forming a piston ring in accordance with the method of this invention.
Figure 8:
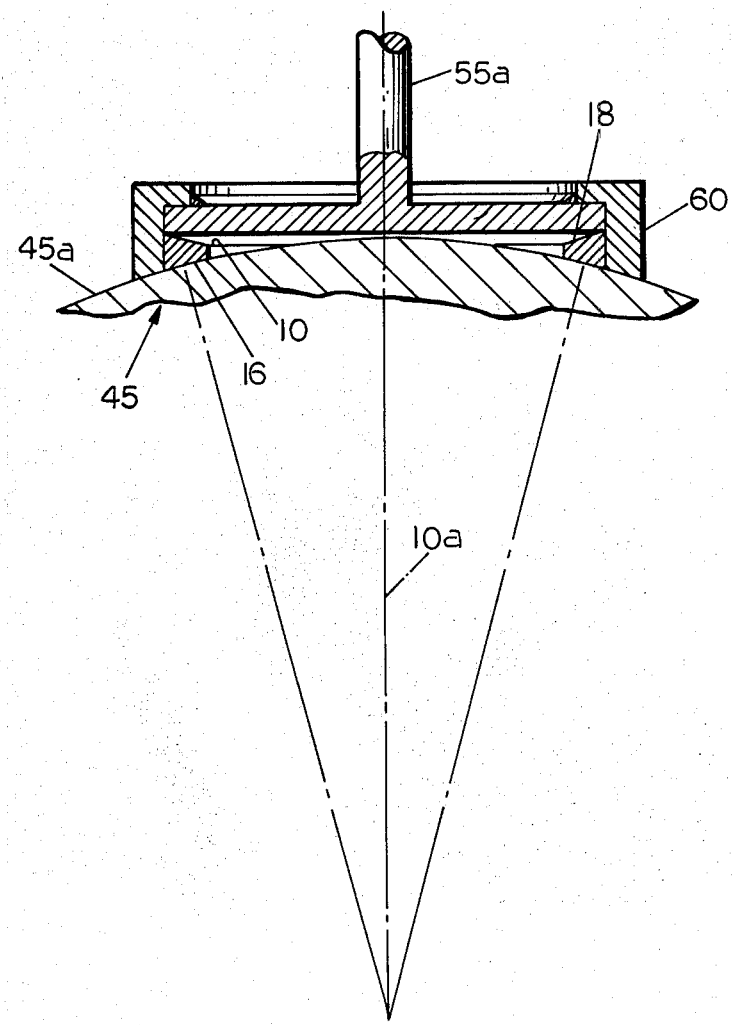
FIG. 8 is an enlarged scale, sectional view of the ring holding mechanism of FIG. 7.

FIGS. 7 and 8 schematically illustrate an apparatus for the commercial production of piston rings 10 and permits a plurality of such rings to be concurrently ground on the rotating spherical segment surface 45a of a working member 45. The machine 46 is provided with a base housing 47 wherein are mounted an appropriate motor and drive mechanism for rotating the working member 45. Also, grinding slurry pumps and a reservoir (not shown) may be contained within the housing 47. In spaced relationship around the housing 47 are provided a plurality of upstanding inverted L-shaped support brackets 50, each bracket functioning to support an axially movable fixture 60 within which is constrained a piston ring 10 whose converging surface is to be ground to a spherical segment contour in the manner schematically illustrated in FIG. 5. A conventional fluid actuated cylinder mechanism 55 is suspended from the end of each support post 50 which overlies the rotating spherical segment working surface 45a. Cylinder 55 has an output shaft 55a for supporting and axially shifting the constraining fixture 60 within which the piston ring 10 is secured with one of its converging sides exposed so as to be engaged by the rotating spherical segment surface 45a. Since the mechanism for supporting and axially shifting the fixture 60 is entirely conventional, the details thereof have not been shown but it should be understood that fixture 60, hence the ring 10, is movable into engagement with the rotating spherical segment surface 45a along a path that is coincident with the axis of the constrained ring 10 and also constitutes a radius of the spherical segment working surface 45a.

Those skilled in the art will recognize that it is unnecessary that the abrasive particles be embedded in the spherical segment surface of the grinding member. Alternatively, as illustrated in FIG. 7, the abrasive particles may be supplied in the form of a water based or oil based slurry which is applied to the rotating spherical segment surface of the grinding member through a suitable pipe 70.

Figure 6:
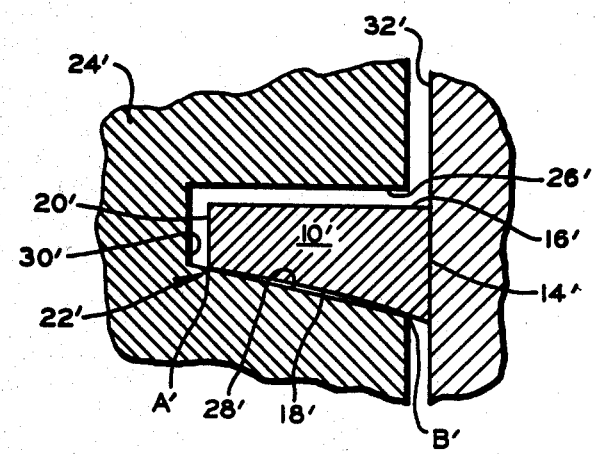
FIG. 6 is an enlarged fragmentary sectional view of a modified form of the piston and piston ring assembly illustrated in FIGS. 1, 2, 3 and 4.

FIG. 6 shows an embodiment of the invention similar to that illustrated in the embodiment of FIGS. 1 through 5, inclusive, but the piston ring 10' includes only a single inwardly converging surface. In this particular embodiment of FIG. 6, the top wall 16' is flat and generally perpendicular to the ring face 14'. The ring 10 includes a rear wall 20' which is generally parallel to the ring face 14', and an inwardly converging bottom wall 18'. The associated groove 22' of the piston 24' is formed with an interior configuration similar to the cross-sectional configuration of the ring 10'. More specifically, the groove 22' includes a top wall 26' which is generally flat, an inwardly converging bottom wall 28', and a flat rear wall 30'. As in the previously described embodiment, the sealing action of the piston ring 10' is improved, in operation, by the pressure of the engine gases. During the power stroke, for example, the pressure of the compression gases against the top wall 16' of the ring 10' forces the ring downwardly on the lower wall 28' of the groove 22' of the piston 24', tending to cam the ring 10' radially outward. This action leaves a clearance at the top side 16' of the ring 10', permitting the gas pressure to travel behind the rear wall 20' which acts to additionally urge the ring 10' to expand radially outwardly against the cylinder wall 32'.

As in the earlier described embodiment, improved sealing characteristics and operating characteristics are achieved by reason of the curved configuration of the bottom wall 18'. This line-to-line contact established between the curved bottom wall 18' of the ring 10' and the bottom wall 28' of the associated groove 22' as at A' and B' in FIG. 6 has resulted in improved operating characteristics.

Another embodiment of the invention which is not as preferable as the previously described embodiment, contemplates a piston ring structure having at least one inwardly converging wall formed to have a slightly convex cross-sectional configuration. The associated groove of the piston adapted to receive the ring would be defined by an inwardly converging facing wall.

As in the previously described embodiments, the sealing action of the piston ring is improved by reason of the curved configuration of the ring surface as it contacts the respective groove surface.

As described with respect to each of the embodiments of the invention, the novel design of the piston ring results in line-to-line contact between the facing surfaces of the piston rings and the respective facing surface of the peripheral groove formed in the piston. These line-to-line contacts are preferably radially spaced from one another and typically are spaced apart over a substantial portion of the entire width of the upper and lower sealing surfaces of the piston ring. Also, it will be appreciated that, in operation the forces applied against the one ring surface by the combustion gases, for example, will actually be concentrated at the opposite surface of the ring and are applied in the concentrated form to the adjacent groove surface along the two spaced apart line-to-line contacts as is clearly illustrated in FIGS. 4 and 6.

What I claim is:

1. The method of simultaneously manufacturing a plurality of split piston rings for a fluid pressure system wherein the rings have at least one inwardly converging surface including the steps of:

constraining the rings;

placing the constrained rings adjacent a spherical surface having abrasive material thereon capable of contouring the inwardly converging ring surfaces, wherein said spherical surface is in excess of the diameter of the constrained rings to define a tangential engagement between said inwardly converging ring surfaces and the spherical surface;

causing the spherical surface to rotate about its center; and applying sufficient pressure to the constrained rings to cause the inwardly converging surfaces thereof to be brought into intimate contact with the spherical surface along a path that is coincident with the axis of the rings and that is a radius of the spherical surface, for an interval to cause the contacting ring surfaces to be conveniently ground to a curved cross-section across the width thereof.

2. The method defined in claim 1 wherein said split piston rings have top and bottom, inwardly converging surfaces and wherein said top and bottom surfaces are subjected to the within steps, to obtain split piston rings having two inwardly converging curved surfaces.

3. The method of concurrently manufacturing a plurality of split piston rings wherein the rings have a generally cylindrical outer side surface and radially inwardly extending top or bottom surfaces, including the steps of:

(1) peripherally and axially constraining the rings in fixtures with either said top or bottom surfaces exposed;

(2) bringing a rotation grinding member having a spherical segment working surface in excess of the diameter of the constrained rings, and with an abrasive coating into tangential engagement with said exposed ring surfaces by relative movement of the member and rings along the axis of the rings and coincident with a radius of said spherical segment surface; and (3) grinding all of the said exposed inwardly converging surfaces of the rings to match the spherical contour of the grinding member.

4. The method defined in claim 3 wherein said top and bottom surfaces are sequentially exposed to the within steps.

5. The method of concurrently manufacturing a plurality of split piston rings wherein the rings have a generally cylindrical outer side surface and radially inwardly extending top and bottom surface, the planes of said top and bottom surfaces being disposed at a converging angle relative to each other, including the steps of:

(1) peripherally and axially constraining the rings in fixtures with one of said inwardly converging surfaces exposed;

(2) moving a rotating grinding member having a spherical segment with a working surface in excess of the diameter of the constrained rings, and with an abrasive coating into tangential engagement with said exposed inwardly converging surfaces by relative movement of the member and the fixtures along a path coincident with the axis of the rings and a radius of said spherical segment surface;

(3) grinding all of the said exposed inwardly converging surface of the rings to a spherical contour into conformity with the said spherical segment grinding surface; and (4) removing the rings from the constraining fixtures and reversing the position of the rings in the fixtures to expose the other inwardly converging surfaces, and relatively moving the rotating spherical segment grinding surface into tangential engagement with said other exposed surfaces along a path coincident with the axis of the rings and a radius of said spherical surface, to grind said other exposed surfaces into conformity with the said spherical segment grinding surface.

* * * * *